Sept. 20, 1966     O. M. COCCHIARELLA     3,273,494

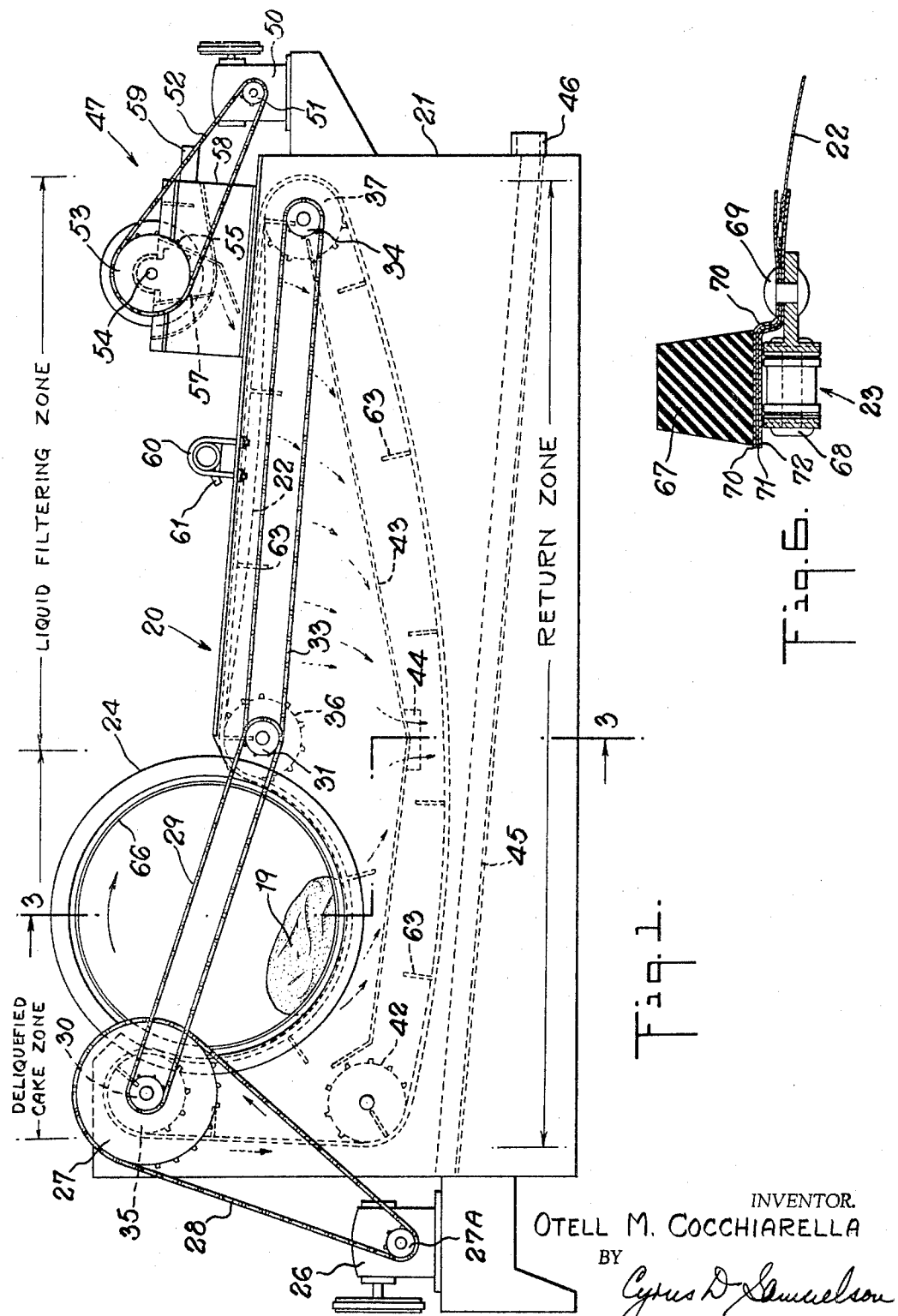

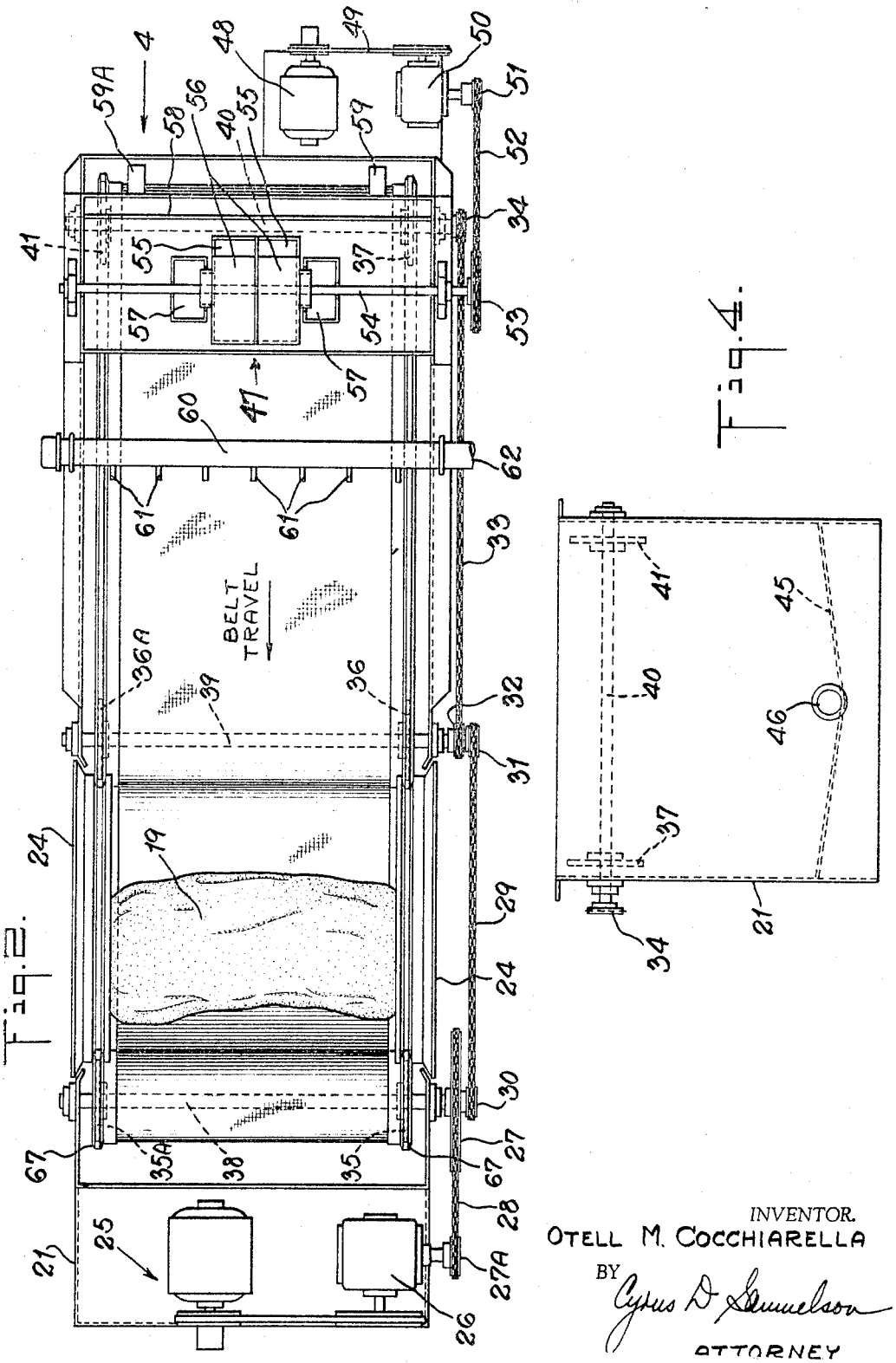

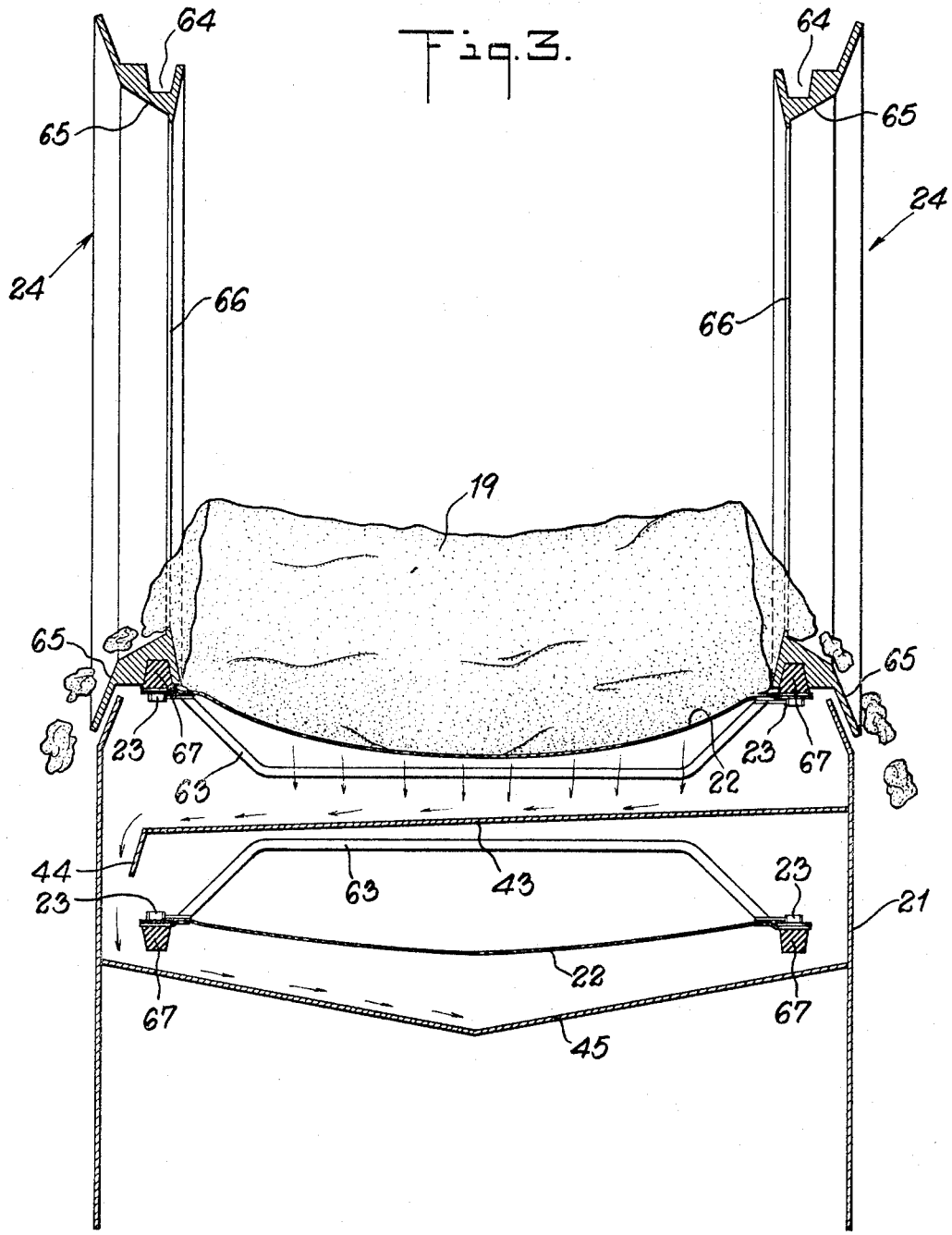

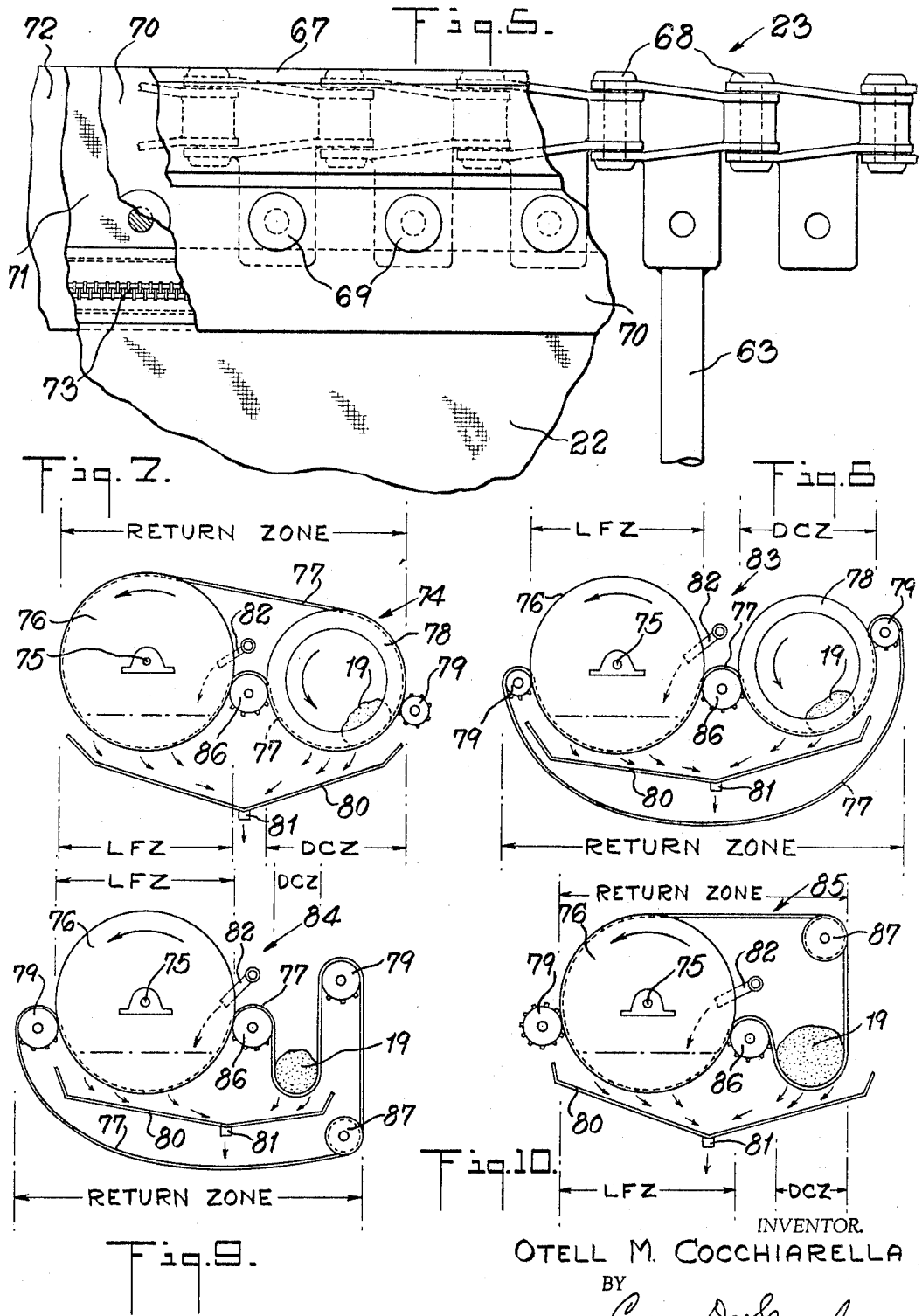

SEWAGE FILTER AND PRESS

Filed March 11, 1965     10 Sheets-Sheet 5

INVENTOR.
OTELL M. COCCHIARELLA
BY
*Cyrus D. Samuelson*
ATTORNEY

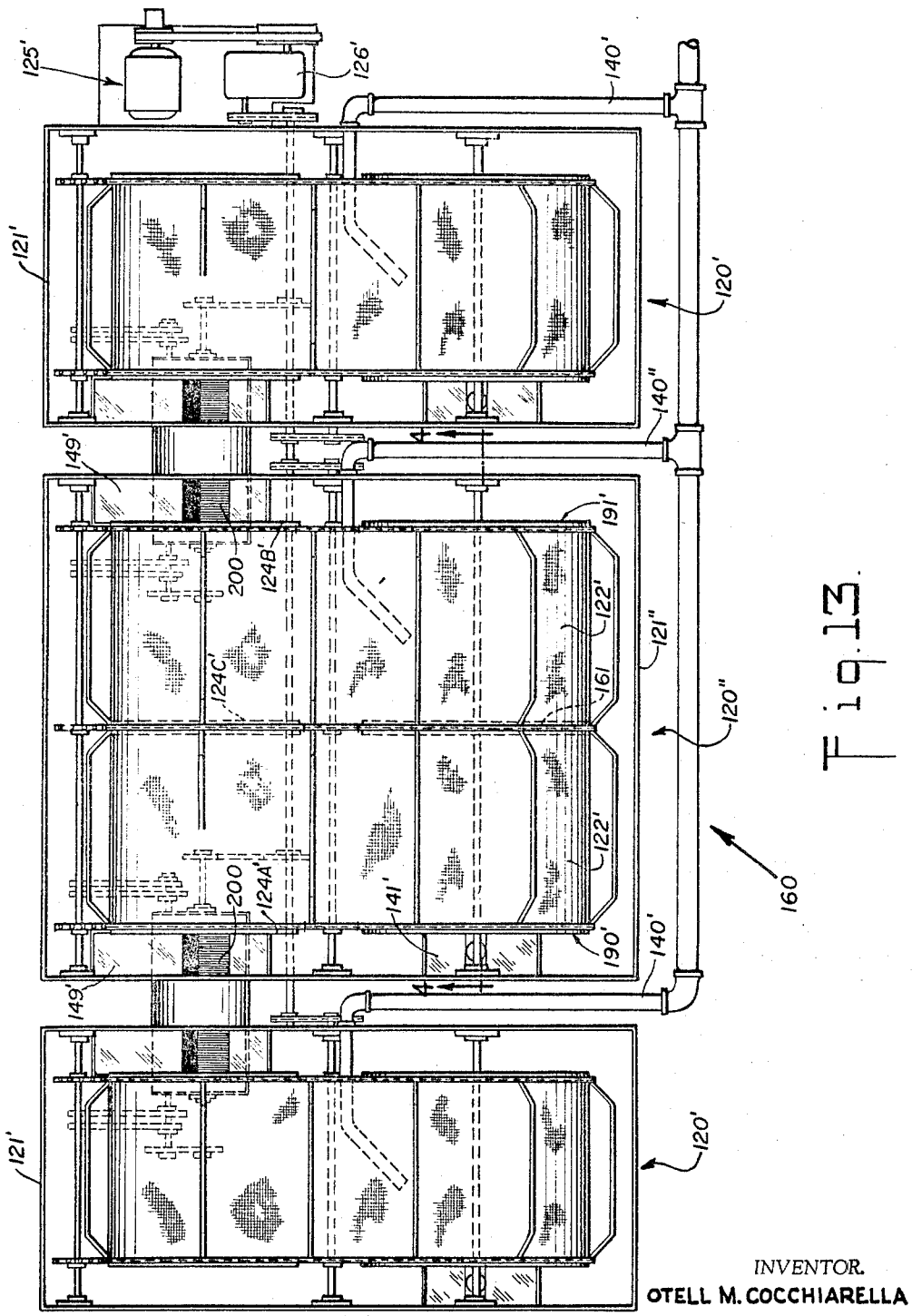

Sept. 20, 1966     O. M. COCCHIARELLA     3,273,494
SEWAGE FILTER AND PRESS
Filed March 11, 1965     10 Sheets-Sheet 7
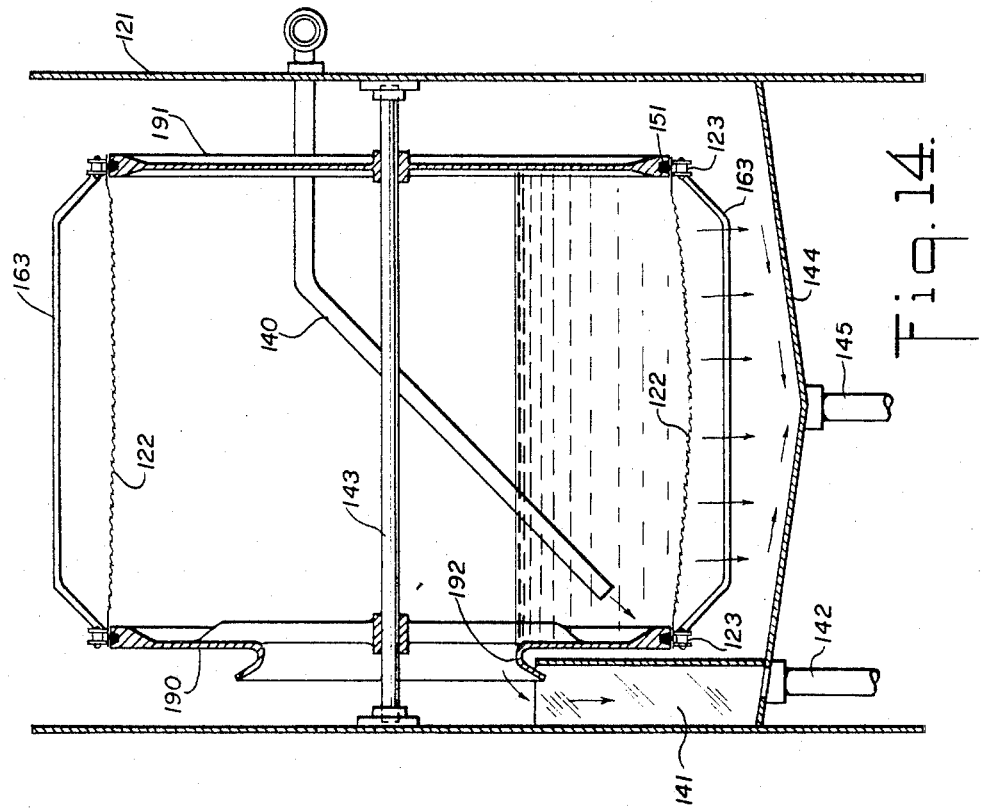
INVENTOR.
OTELL M. COCCHIARELLA
BY
ATTORNEY Sept. 20, 1966 O. M. COCCHIARELLA 3,273,494
SEWAGE FILTER AND PRESS
Filed March 11, 1965 10 Sheets-Sheet 8
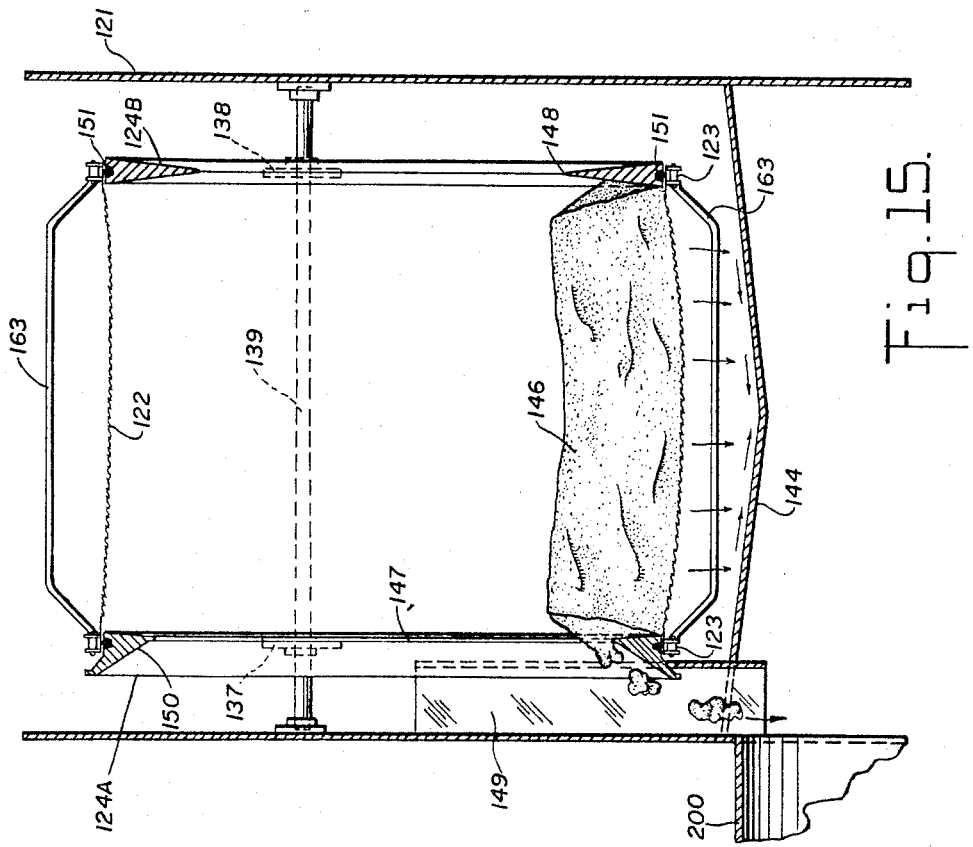
INVENTOR.
OTELL M. COCCHIARELLA
BY
Cyrus D. Samuelson
ATTORNEY

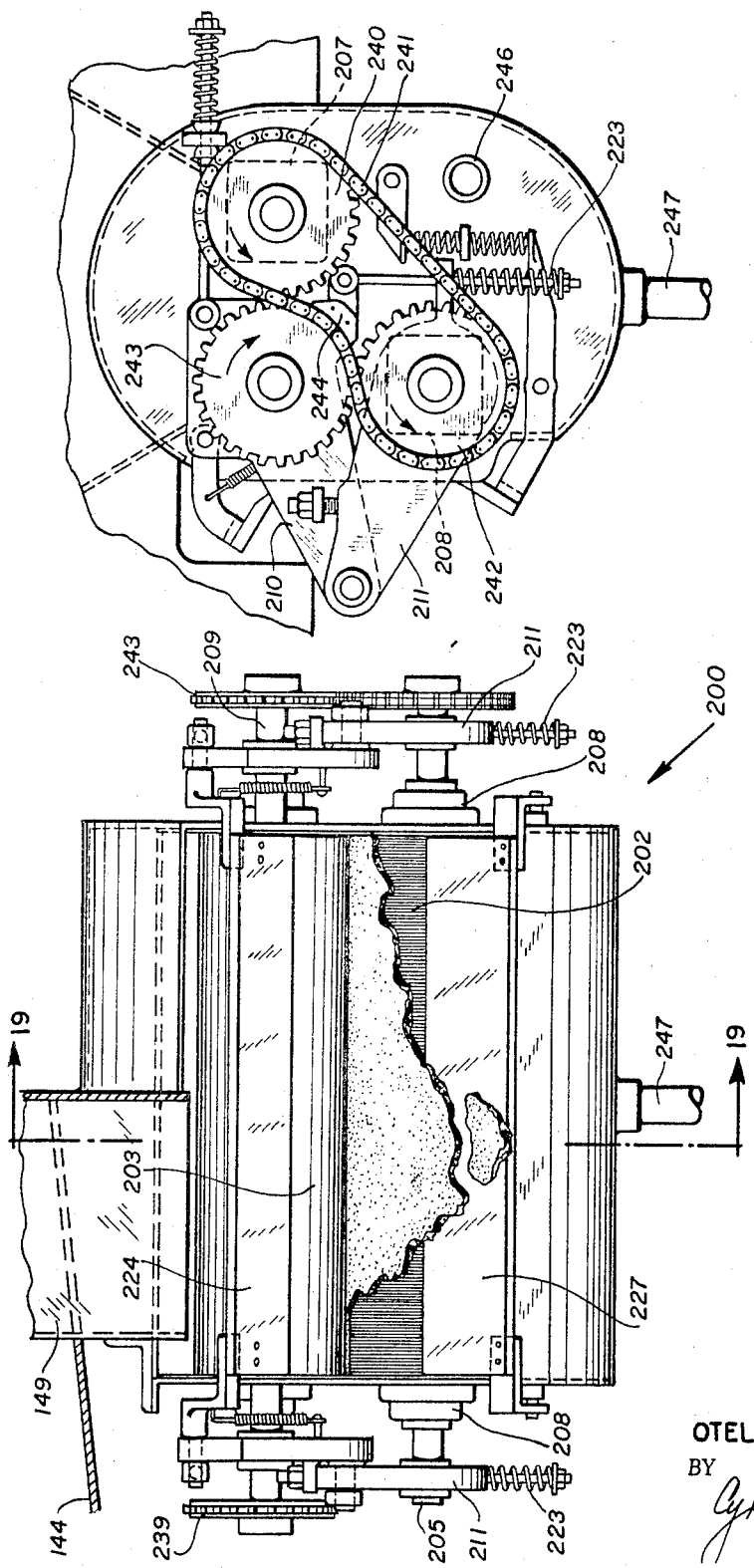

Sept. 20, 1966 O. M. COCCHIARELLA 3,273,494
SEWAGE FILTER AND PRESS
Filed March 11, 1965 10 Sheets-Sheet 10

INVENTOR.
OTELL M. COCCHIARELLA
BY Cyrus D. Samuelson
ATTORNEY

United States Patent Office 3,273,494
Patented Sept. 20, 1966

3,273,494
SEWAGE FILTER AND PRESS
Otell M. Cocchiarella, 99 Linden Ave., Verona, N.J.
Filed Mar. 11, 1965, Ser. No. 446,765
18 Claims. (Cl. 100—121)

This application is a continuation-in-part of applications for U.S. Letters Patent 143,082 filed October 5, 1961 and 211,208 filed July 30, 1962, both applications now abandoned, and relates to the separation of liquids from solids and particularly relates to the removal of liquid from sewage utilizing an endless travelling belt filter.

As used herein the term sewage broadly includes domestic, municipal and industrial wastes of liquid-solid slurries wherein the solids are to be separated from the liquid.

In sewage treatment plants, liquids are separated from the solids at various stages. However, it is most economical to carry out this operation at the earliest possible time, preferably on the raw primary sludge. It is accordingly a primary object of this invention to provide a method and apparatus suitable for separating liquids from solids in raw primary sewage.

Heretofore, many attempts have been made to treat sewage by various chemical methods, including the use of various coagulents, flocculating agents and clarifying agents. However, the disadvantages of these methods have prevented their widespread usage and favored the development of more efficient and economical mechanical separations. Among their disadvantages are inability to operate on other than dilute materials. It is thus an object of this invention to provide an improved mechanical method that is useful for the deliquefaction of primary raw settled sludges and that does not require the use of coagulents or other chemical aids.

In many of the prior art deliquefying devices, it is necessary to use vacuum systems or a series of deliquefying filters in order to obtain sufficient deliquefaction to enable one to dispose of the solids without undue interference caused by the presence of excess liquid. It has been obvious to workers in the art that the ideal sewage filter is one which operates by gravity and at atmospheric pressure. Accordingly, it is another object of this invention to provide a gravity sewage filter system that operates at atmospheric pressures.

To provide an extended filtration zone and yet not increase the overall size of the apparatus involved, travelling filter belts have been used. It is an object of this invention to provide a method and apparatus for sewage separation that utilizes a travelling filter belt. However, the use of travelling filter belts has been limited in many applications, because of the time consuming operations necessary to clean or replace them. It is therefore a further object of this invention to provide a sewage deliquefaction method incorporating an endless filter belt that is substantially self-cleaning.

In U.S. Patent 2,798,609 issued to E. G. Smith and me, as co-inventors, a sewage treatment apparatus embodying a rolling cylindrical mass of solids is disclosed. It is another object of this invention to combine an endless gravity filter with a rolling cylindrical mass to simultaneously discharge filtered material and clean the endless belt.

A still further object of my invention is to provide means to control the level of feed of the liquid slurry to obtain maximum filtration efficiency with a minimum of applied external operator control.

A further object of my invention is to provide such a filter which discharges deliquefied sludge of uniform moisture content at a uniform rate.

A still further object of my invention is to provide such a filter wherein an endless belt, gravity filter is combined with a press into a unitary device capable of producing a deliquefied cake which will support combustion.

A still further object of my invention is to provide a press which is capable of being used with gravity endless belt sewage filters.

It is a further object of this invention to provide apparatus wherein optimum filter pressures may be maintained as the liquid is eliminated from the sludge.

A still further object of my invention is to provide simple and rapid means of replacing the filter cloth of an endless belt, gravity type sewage filter.

These and other objects will become apparent during the course of the following description.

Briefly stated, the present invention is a process and apparatus for the deliquefaction of sewage and similar sludges that basically comprises the following steps:

(a) Supplying to an endless belt filter sewage that is to be filtered;

(b) Gravity filtering said sewage while said belt moves through a filtering zone wherein a pool of liquid is maintained at a predetermined level to provide a pressure head;

(c) Passing the partially deliquefied sewage on said endless belt from said filtering zone to a deliquefied cake zone in a manner such that liquid is substantially prevented from accompanying said partially deliquefied sewage into said deliquefied cake zone;

(d) Causing the partially deliquefied cake to collect and roll into a substantially cylindrical roll thereby collecting the product and cleaning the belt in a single operation;

(e) Discharging portions of said deliquefied cake when it reaches a predetermined size; and (f) Optionally passing said cake to a press specifically designed to progressively increase the pressure as further liquid is eliminated for producing a substantially deliquefied sludge.

A complete understanding of the invention may be obtained from the following description and explanation, which refer to the accompanying drawings wherein:

FIGURE 1 is a side elevational view of a preferred embodiment of the filter of my invention;

FIGURE 2 is a plan view of the embodiment of FIGURE 1;

FIGURE 3 is an enlarged cross-sectional view along the lines 3—3 of FIGURE 1, viewed in the direction of the arrows;

FIGURE 4 is an end elevational view of the embodiment of FIGURE 1 with the drive motor of the slurry feed system removed and viewed in the direction of arrow 4 of FIGURE 2;

FIGURE 5 is an enlarged plan view of a portion of the driving chain showing the means by which the filter medium is joined to the drive chain;

FIGURE 6 is an enlarged elevational view showing the means by which the drive chain is joined to the flexible sides;

FIGURES 7 through 10 are diagrammatic elevational views of various alternative embodiments of sewage filters of my invention;

FIGURE 13 is a plan view of a multi-celled sewage filter of my invention;

FIGURE 14 is an enlarged cross-sectonal view taken along the lines 14—14 of FIGURE 11;

FIGURE 15 is an enlarged cross-sectional view taken along the lines 15—15 of FIGURE 11;

FIGURE 16 is a front elevational view of a preferred embodiment of a press according to my invention;

FIGURE 17 is a right side elevational view of the press of FIGURE 16;

Figure 12:
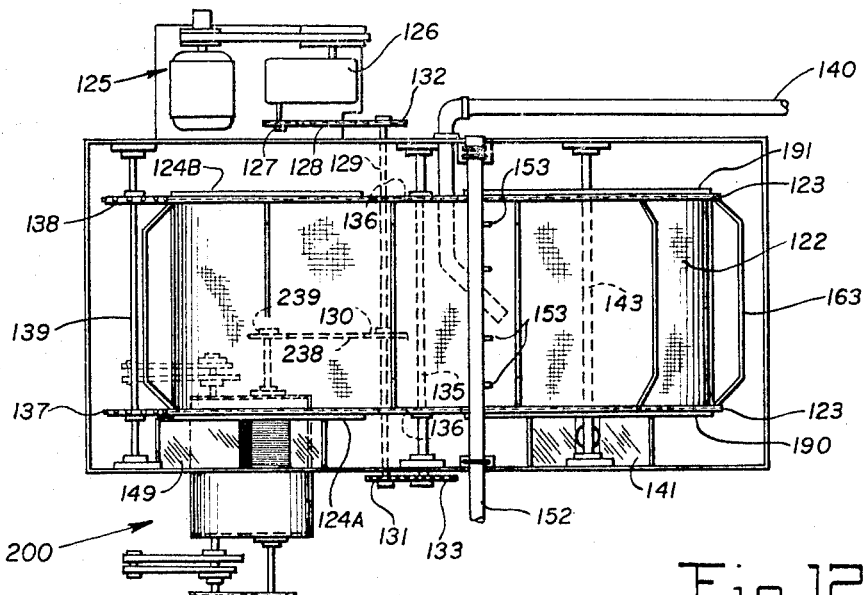
FIGURE 12 is a plan view of the sewage filter of FIGURE 11.

In the drawings, wherein, for the purpose of illustration are shown several embodiments of the sewage filter of my invention, and wherein like numerals are employed to designate like parts throughout the same, the numeral 20 designates a preferred embodiment of sewage filter of my invention generally. Sewage filter 20 is seen to comprise frame or housing 21, cloth filter medium 22, endless drive chains 23 and free-floating rings 24. Cloth filter medium 22 is preferably formed of nylon cloth of approximately 100 mesh woven of 100 denier monofilament yarn.

The circuit travelled by the endless belt filter medium 22 is divided into three zones: first, the liquid filtering zone; second, the deliquefied cake zone; and third, the return zone. The liquid filtering zone is arranged with a slight upward tilt toward the deliquefied cake zone. This upward tilt keeps the two zones separated and holds back any carry-over of dilute liquid from the liquid filtering zone to the deliquefied cake zone. Only a highly concentrated sludge is carried over into the deliquefied cake zone.

Endless belt filter medium 22 is suspended between two parallel endless chains 23. Chains 23 may be of any suitable type so long as they may be driven and used to move the filter medium 22. FIGURE 5 illustrates the means by which I prefer to attach the filter medium to the chains. The separate links of chain 23 are joined by means of pintles 68. Neoprene strip 72 is laid over chain 23 for the complete length of the chain. Cloth strip 71 with one-half of zipper 73 affixed thereto is laid over neoprene strip 72 and neoprene strip 70 is laid over cloth strip 71 (FIGURES 5 and 6). All three strips are cemented together by means of rubber cement or similar material and the combination is held together by means of rivets 69. Flexible dam 67 of neoprene or similar material is cemented to neoprene strip 70 in any manner which is well-known in the art (FIGURE 6).

The other half of zipper 73 is affixed to filter medium 22 and the filter medium is joined to the chains by closing zipper 73. Thus it can be seen that cloth filter medium 22 is joined to chains 23 by the closing of zippers 73 so that when the chains are driven in the manner which will be described below, the belt is moved. By affixing the cloth filter medium to the chains in the manner described I am able to install and replace the filter medium simply, rapidly and economically. Cloth filter medium 22 is made endless by overlapping the two ends for about one or two inches to form a joint which is held together by a suitable cement of by other means such as sewing.

Dam 67 is an endless strip and is cemented or otherwise affixed to neoprene strip 70 and serves as both a slide dam and a freeboard for the liquid pool. Dam 67 is preferably trapezoidal in cross-section so that it fits easily into groove 64 in free-floating ring 24 (FIGURE 3). Tie rods 63 are shaped as shown in FIGURE 3 so that cloth filter medium 22 is free to sag when it is loaded with the sludge material. Tie rods 63 are preferably about 5/16" to 3/8" in diameter and are spaced approximately on 10" to 12" centers. The tie rods serve to prevent improper tracking of chains 23 since they serve to minimize horizontal lateral pulling of the chains and thereby eliminate sprocket jumping by the chains.

FIGURES 1 and 2 illustrate the drive assembly which is employed to move cloth filter medium 22. Numeral 25 designates the drive motor and its V-belt generally. Motor and belt 25 drive gear reduction box 26 so that the cloth travel velocity is of the order of 0.7 inch per second to 2.25 inches per second. The faster velocities are useful when freely dewatered sludges are treated and the slower velocities are useful when poor draining sludges are processed. Generally, the slower velocities are more desirable because it enables the user of the sewage filter to obtain better stripping of the deliquefied cake from the cloth filter medium which results in more positive operation and also provides a clearer filtrate. The velocity selected by the operator will usually be the one which yields the best production of deliquefied cake from the standpoint of capacity with less attention being paid to the clarity of the filtrate.

Sprocket 27A on gear reduction box 26 drives sprocket 27 by means of roller chain 28. Sprocket 27 is mounted on shaft 38 along with sprocket 30, and sprockets 35 and 35A. Sprockets 35 and 35A are used for driving chains 23. Sprocket 30 drives sprocket 31 by means of roller chain 29. Sprocket 31 is mounted on shaft 39 along with sprocket 32, and chain drive sprockets 36 and 36A which drive chains 23. Sprocket 32 drives sprockets 34 by means of roller chain 33. Sprocket 34 is mounted on shaft 40 along with sprockets 37 and 41 which drive chains 23. Drive chains 29 and 33 also serve to maintain the proper vertical circuit of the belt filter medium 22.

The material to be deliquefied is fed onto belt filter medium 22 by means of box feeder 47 (FIGURES 1 and 2). Motor 48 drives gear reduction box 50 by means of V-belt 49. Drive sprocket 51 drives sprocket 53 by means of roller chain 52. Sprocket 53 is mounted on shaft 54 along with vanes 56 which are rotated by the shaft. The material to be deliquefied is fed through pipe 59 into box 58. Pipe 59A is an overflow outlet. It is then picked up by the vanes 56 and carried through buckets 55 into outlets 57. Outlets 57 deposit the material onto filter medium 22.

As the material travels along, the liquid contained in it drains through the cloth belt 22 and is collected on intermediate pan 43. The liquid in pan 43 spills out through side outlet 44 onto bottom pan 45 and thence through drain 46 to a disposal bed or similar system.

As the material leaves the liquid filtering zone, it is carried down into the lower portion of the deliquefied cake zone. The principal purpose for having the belt drop down in the deliquefied cake zone is to enable the cloth to travel vertically in an upward path at the terminal end of the deliquefied cake zone. This upward vertical movement in the deliquefied cake zone helps to clean the cloth filter medium so that the sewage filter may be operated continuously. Gravity acting on the sludge deposited on the cloth causes the sludge to slide down to the bottom of the zone and to collect and roll into a roughly cylindrical mass. The lineal velocity of the cloth and the nature of the sludge determines the stripping efficiency. As a general rule, the slower the velocity the more positive the stripping.

As additional sludge is fed into the sewage filter, the rolling cake mass 19 will become enlarged as a result of the cohesive action of the sludge particles, in much the same manner as a snowball rolling downhill. The inside diameter of free-floating rings 24 control the overall size of the sludge cake 19. The maximum size of the cake is controlled by the height of the lips 66. I prefer to use a ring inside diameter of 20" and a lip height of 1½". These dimensions result in a total rolling cake mass of approximately 70 pounds and a cake volume of approximately 5 gallons.

The rolling cake mass 19 cleans filter cloth 22 very effectively because the cloth apertures have not been clogged due to excessive filtering pressures.

After the sludge cake has reached its maximum size (controlled by the ring lip height), further increase in the mass of the cake tends to force the material sideways over lips 66 of retainer rings 24 and to discharge from the sewage filter in its maximum deliquefied condition. Most of the cake thus discharged tends to come from the inner portion of the rolling sludge mass where it is at its highest density. The discharged mass is collected on a conveyor (not shown) or in any other suitable container or pan.

I have found that sewage filters of my invention will discharge a cake mass having a solids content of the order of 11% to 18% when fed with a material containing suspended solids of the order from 1½% to 6%. The discharged sludge is of such consistency that it may be readily handled on a conveyor or shovel. If further deliquefying is necessary, the discharged sludge may be processed on a filter press. If this is done, raw primary sludge may be brought to a consistency of about 33%. Such a sludge cake has sufficient B.t.u. content that it can be dried and burned without the addition of fuel. It can thus be seen that the use of sewage filters of my invention results in practical and economical disposition of raw sewage solids and eliminates other costly treatments usually required in a sewage disposal plant.

Free-floating rings 24 (FIGURE 3) should have a cross-section such that they fit over chains 23 and are held in alignment by grooves 64 which cooperatively engage dams 67. The inner face of lips 66 should be slightly canted to the outside rather than straight and vertical to permit smooth cutoff of the portion of the cake being discharged. The outer faces 65 of rings 24 should be beveled away from their centers so that the discharged solids will drop off the rings. Otherwise, the efficiency of the device is impaired by the collection of discharged material around the edge of the lip. Lips 66 and outer faces 65 should be smooth so that frictional resistance to the rolling sludge cake is held to a minimum. If desired, one of the rings 24 may be closed so that the cake is discharged from only one side of the machine. Wash spray pipe 60 with spray nozzles 61 is fed with suitable wash water at inlet 62 for purposes of cleaning the cloth filter medium when the unit is shut down.

The operation of sewage filter 20 is as follows: material to be deliquefied is fed through inlet 59 and discharged in measured amounts through feeder 47 onto cloth filter medium 22. As cloth filter medium 22 travels towards rings 24, the liquid held in mechanical bond is freed and drains through filter medium 22 into intermediate pan 43. The liquid in intermediate pan 43 drains out through side outlet 44 onto bottom pan 45. The liquid on bottom pan 45 drains out through outlet 46 to a suitable disposal system. As the cloth continues to move it enters the deliquefied cake zone where the sludge cake is formed as has been described heretofore. The liquid which drains out in the deliquefied cake zone is also caught on the intermediate pan. After the filter medium leaves the deliquefied cake zone it enters the return zone. During the travel through the return zone there is no processing of the material on that portion of the filter medium. In some installations it may be advantageous to discharge the liquid from the intermediate pan through the cloth filter medium to the bottom pan. I prefer to discharge the liquid through a side outlet such as outlet 44 so that the liquid flow from the intermediate pan to the bottom pan does not flow through the cloth filter medium.

Separation of the two zones of operation on sewage filters of my invention is most useful in providing no intimate contact of the liquid slurry with the rolling cake mass. This prevents the absorption of liquid in the area in which one is attempting to remove liquid. It can be seen that a longer filtering time for draining is provided than is available in other types of gravity filters. Sewage filters of my invention formed, for example, of cloth 18" wide and having a 5' long filtering zone will provide 27 seconds of filtering time at a cloth travel velocity of 2¼ inches per second and will provide 86 seconds of filtering time at a lineal cloth velocity of 0.7 inch per second. The longer draining time will yield a better filtrate clarity due to the fact that the liquid drains through a light deposit of solids. In the deliquefied cake zone the rolling sludge mass is free to shed liquid and clean the fabric without intimate contact with the slurry.

After operation of the filter is stopped, I have found it best to clean the cloth filter medium 22 by running it past wash spray pipe 60. Clear water or other cleaning liquid is fed in at inlet 62 and is sprayed onto cloth filter medium 22 through spray nozzles 61. Cloth filter medium 22 is cleaned after a few cycles of such washing.

Since the wash spray is directed through the cloth from the back, particles of sludge which have been left in or over the cloth apertures will be washed free. Removal of the sludge particles in or over the cloth apertures is important to the successful continuous operation of the sewage filter. If these particles are permitted to dry in position, the apertures will become blocked thereby reducing the efficiency of the filter and making subsequent filtration difficut.

In FIGURES 7 through 10 there are illustrated several alternate embodiments of sewage filter zones. In all these embodiments I separate the liquid filtering zone (LFZ) from the deliquefied cake zone (DCZ) in order to obtain the advantages which I have set out in detail in my description of the embodiment of FIGURES 1 through 6. In FIGURE 7 sewage filter 74 is seen to comprise a pair of closed disks 76, shaft 75 and cloth filter medium 77 similar to cloth filter medium 22 of the previously described embodiment. Closed disks 76 are affixed to shaft 75 so as to rotate freely. At least one free-floating ring 78 similar to rings 24 of the embodiment of FIGURES 1 through 6 makes up the deliquefied cake zone. Open free-floating ring 78 and closed disks 76 cooperatively engage a dam similar to dam 67 of the first described embodiment (details not shown). The cloth filter medium 77 is driven by sprockets 86. Pan 80 having outlet 81 is provided to dispose of the liquid separated from the sludge slurry. Feeder 82 is used to feed the material to be processed onto cloth 77 between disks 76. Grooved disks 87 are provided to engage the flexible dams and keep the filter medium 77 in proper position (details not shown) (FIGURES 9 and 10).

Idler sprockets 79 are employed to guide cloth filter medium throughout its travel and support disks 78. Sprockets 86 are rotated by a motor (not shown). This action moves cloth filter medium 77 in a manner similar to that which I have described heretobefore. The liquid slurry is collected between the disks 76 and drains through cloth 77 onto pan 80 and then out through outlet 81. As the cloth moves it enters the deliquefied cake zone and forms sludge cake 19. The excess of sludge cake 19 is discharged over the rim of ring 78 onto a conveyor or pan.

Sewage filter 83 of FIGURE 8 is similar in structure and operation to sewage filter 74 of FIGURE 7; the difference between them being the location of the cloth filter medium return zone. In sewage filter 74 the return zone is above the liquid filtering zone and the deliquefied cake zone and in sewage filter 83 the return zone is below the liquid filtering zone and deliquefied cake zone. In sewage filter 83 outlet 81 is placed so that the discharged liquid does not flow onto cloth 77 in the return zone.

Sewage filter 84 in FIGURE 9 is similar to sewage filter 83 of FIGURE 8 except that the free-floating rings in the deliquefied cake zone of sewage filter 83 have been eliminated. The cake is formed on the cloth belt and is aided in its formation by the sharp vertical rise of the cloth as it leaves the deliquefied cake zone. Sludge discharges from cake 19 after it rises above the height of the flexible dams which are affixed to the sides of the cloth (details not shown).

Sewage filter 85 of FIGURE 10 is similar to sewage filter 84 of FIGURE 9 except that the return zone in FIGURE 9 is below the liquid filtering and deliquefied cake zones.

Even though sewage filters of my invention are of the endless belt type and have no true end, I choose to designate the end of the liquid filtering zone (LFZ) as the terminal end of the device.

FIGURES 11 through 15 are views of a second preferred embodiment of the invention. This embodiment is distinguished from the embodiment shown and described in FIGURES 1–10 by the following features:

(1) The liquid filtering zone is defined by a pair of discs, at least one of which has a circular opening, and about which the endless belt travels circumferentially; and (2) The liquid level within the liquid filtering zone is controlled by a constant flow supply means, an overflow device, and an outlet pipe.

In addition a sludge press, as previously mentioned, is provided to receive the discharge from the deliquefied cake zone of the filtering apparatus and further process it to form a combustion supporting material.

Referring now to FIGURE 11 through 15 in general, where like numerals designate like parts throughout, the numeral 120 designates a single cell sewage filter generally. Sewage filter 120 is seen to comprise frame or housing 121, endless belt filter medium 122, endless drive chains 123, discs 190 and 191, and free-floating rings 124A and 124B.

Endless belt filter medium 122 is connected to endless drive chains 123 and driven in substantially the same manner as described above in reference to the other embodiments by drive motor 125, and its associated V-belt through gear reduction box 126. Belt velocity is governed on the same principle hereinbefore set forth.

In order to separate the liquid filtering zone from the deliquefied cake zone, cloth filter medium 122 is arranged to leave the zone at a point slightly below the centerline of discs 190 and 191 and above the level of the liquid slurry in the zone. Thus, there is no overflow or carry over of dilute liquid from the liquid filtering zone to the deliquefied cake zone. Only a highly concentrated sludge deposit which adheres lightly to cloth 122 is carried over into the deliquefied cake zone.

Figure 11:
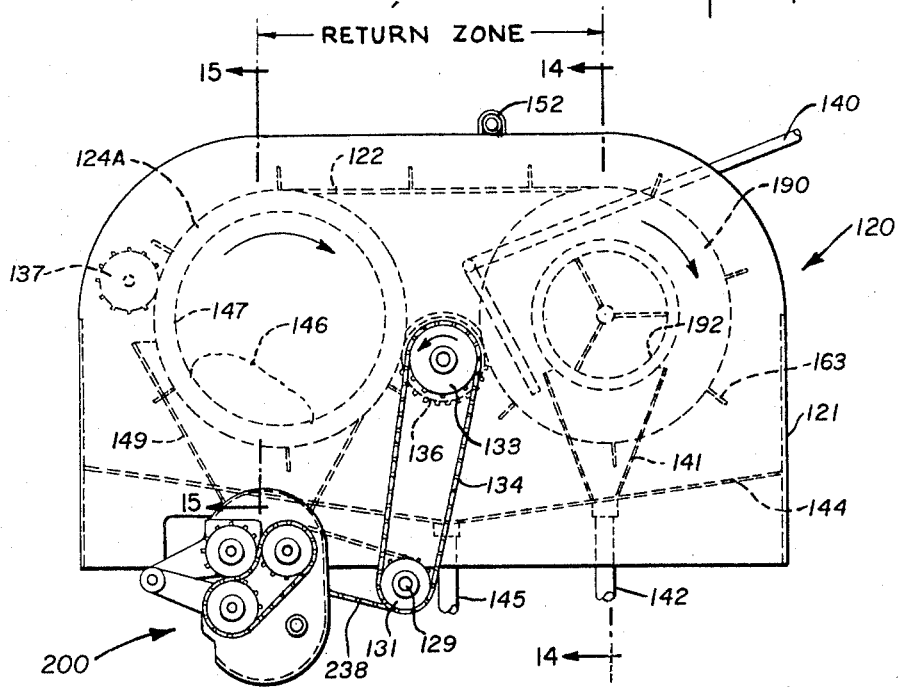
FIGURE 11 is a side elevational view of another preferred embodiment of my invention.

Sprocket 127 on gear reduction box 126 drives sprocket 132 by means of roller chain 128 (FIGURE 12). Sprocket 132 is mounted on shaft 129 along with sprockets 130 and 131. Sprocket 131 drives sprocket 133 through roller chain 134 (FIGURE 11). Sprockets 136 are mounted on shaft 135 along with sprocket 133. Sprockets 136 are used to drive chains 123 and thereby drive and guide cloth filter medium 122. Idler sprockets 137 and 138 (FIGURES 11 and 12) are mounted on shaft 139 and serve to guide and support floating rings 124A and 124B (FIGURES 11 and 12). Tie rods 163 similar to previously described tie rods 63 are provided.

End disc 190 is provided with circular opening 192 through which the overflow of the feed slurry is discharged. The feed slurry is fed by gravity or is pumped through pipe 140 between end discs 190 and 191 (liquid filtering zone). The rate is such that the overflow of liquid slurry flows through opening 192, down overflow box or funnel 141 and through outlet pipe 142. This overflow from the feed is returned to the head of the plant for processing. End disc 191 is preferably solid so that the overflow only flows out one end of the sewage filter. However, it is possible to use a system in which both end discs are provided with central openings and the overflow flows out of both sides.

Referring to FIGURE 14, end discs 190 and 191 are rigidly mounted and locked in position on shaft 143. Grooves in both discs engage dams 151 on each edge of the moving cloth filter medium and rotate due to the friction between the dams and the grooves in the discs in the manner previously described. The feed of the liquid slurry is maintained at a rate that permits a small amount of constant overflow through opening 192. Under these conditions the filter cell will be operating at maximum filtering pressure head and filter surface contact area. If the feed area drops off so there is no overflow of slurry through opening 192 and the level in the liquid filtering zone drops, no harm will be done to the filter cloth or to the filtering operation. However, there will be a reduction in the filtrate output due to the lower liquid pressure head on the cloth apertures and the smaller area of cloth surface contacted by the liquid pool. It can therefore be seen that the operating liquid pressure head is limited by the overflow feature provided in sewage filters of my invention.

I have found that a convenient diameter for the discs 190 and 192 is approximately 19 inches. For such discs, I make opening 192 in disc 190 approximately 9 inches in diameter. As a result the slurry will overflow after it reaches a depth of 5 inches in the liquid filtering zone. The resulting head pressure is thus less than the one inch of mercury which is critical for colloidal slurries. Feed pipe 40 directs the incoming slurry against the lower inside rim of disc 190 to prevent driving the colloidal solids into cloth 122 and jamming the apertures due to the impact force.

The sludge liquid drains through filter cloth 122 by gravity under the low filtering pressure. A layer of solids is left behind on the inside surface of cloth 122 and is carried over into the lower portion of the deliquefied cake zone on the continuously moving belt. The filtrate drops onto pan 144 and out through pipe 145. This filtrate liquid is returned to the head of the plant to be recombined with the incoming sludge. As shown in FIGURE 15, the maximum size of the sludge cake 146 is controlled by the height of lip 147 on free-floating ring 124A. Free-floating ring 124B is provided with lip 148 which is much higher than lip 147 so that the discharge from the cake is through the opening in ring 124A.

After the sludge cake has reached its maximum size as determined by the height of lip 147, further increase in the mass of the sludge cake forces the material sideways over lip 147 and down chute 149. The liquid drained from the sludge cake in the deliquefied cake zone drops to pan 144 and combined with the filtrate from the filtering zone passes out through pipe 145 and back to the head of the plant.

Cloth 122 next passes through the return zone in which there is no processing of the slurry or sludge material. Wash spray pipe 152 and spray nozzles 153 are located above the cloth return zone and a washing operation similar to that described above is effected.

The sludge cake that is discharged down chute 149 passes into a two-stage press 200 described particularly hereinafter. This press is specifically designed to increase filtering pressure as the solids concentration of the sludge increases.

In FIGURE 13, I have illustrated a multi-celled sewage filter 160 similar to sewage filter 120 except that it is comprised of a plurality of cells. Specifically, it is seen to comprise single cells 120' and double cell 120". Single cells 120' are similar to sewage filter 120 which has been described in detail previously in this specification. The elements of single cells 120' are mounted in frames 121' and the slurry is fed to them through pipes 140'. Presses 200 are mounted between the sides of double cell 120" and single cells 120' so that they can process sludge delivered from each of the cells with which they are associated.

Since the structure of cells 120' is similar to filter 120, which has already been described, the structure of these single cells in the multi-celled bank of sewage filter 160 will not be described. Dual cell sewage filter 120" is seen to comprise frame 121", end discs 190' and 191', spoked or webbed disc 161, floating rings 124A', 124B' and 124C', and dual cloth filter mediums 122'. Slurry is fed to dual cell 120″ through pipe 140″ against spoked disc 161. Disc 161 is spoked to permit flow of slurry into both cells. After the slurry reaches the level of opening 192′ in disc 190′ it flows out into overflow box or funnel 141′ to be returned to the head of the plant.

The overflow feature of the system permits the operation of a number of cells from a common feed source without the need of individual feed rate controls on each cell. If desired, a float control or similar level control device (not shown) may be installed in one of the cells and set to cut off the slurry supply when a predetermined height of slurry is reached. The control can be set so that the feed is actuated when the slurry level drops about one or two inches. The valve operated by the level control should be of the full open and closed type without throttling features. This prevents clogging of the valve by the solids in the slurry. The overflow openings in the end discs will take care of accidental overflowing when the level control system is used.

I have found that filtering pressures are directly related to the percent solids concentration in the slurry. Highly colloidal slurries and low solids concentrations in the range of 1% to 2% solids (99% to 98% liquid) require filtering pressures which are less than one inch of mercury pressure head. A head greater than 1 inch of mercury will cause the colloidal solids to jam into the apertures in the cloth. This clogging reduces the flow of filtrate through the cloth and makes the subsequent removal of the deposited cake very difficult. Operation of the filter according to my invention permits the formation of a pool having a maximum depth of about 2″ (a very low filtering pressure). With higher solids content in the slurry, the liquid pressure head may be increased.

By way of example but not by way of limitation, following is an illustrative table of the relationship between critical filtering pressures and the solids content of the slurry. These values are approximate and will vary with the types of slurry.

| Critical filtering pressure, p.s.i.: | Solids content in slurry (percent) |
| --- | --- |
| 25 | 15–33 |
| 10 | 11–15 |
| 5 | 8–11 |
| 1 | 4–8 |
| 0.4 | 1–4 |

Figure 19:
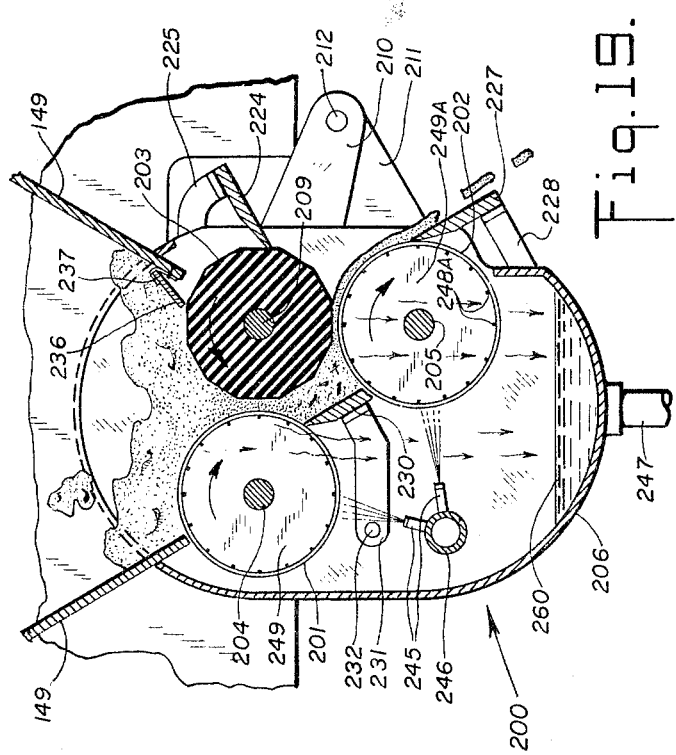
FIGURE 19 is a cross-sectional view taken along the lines 19—19 of FIGURE 16, viewed in the direction of the arrows.
Figure 18:
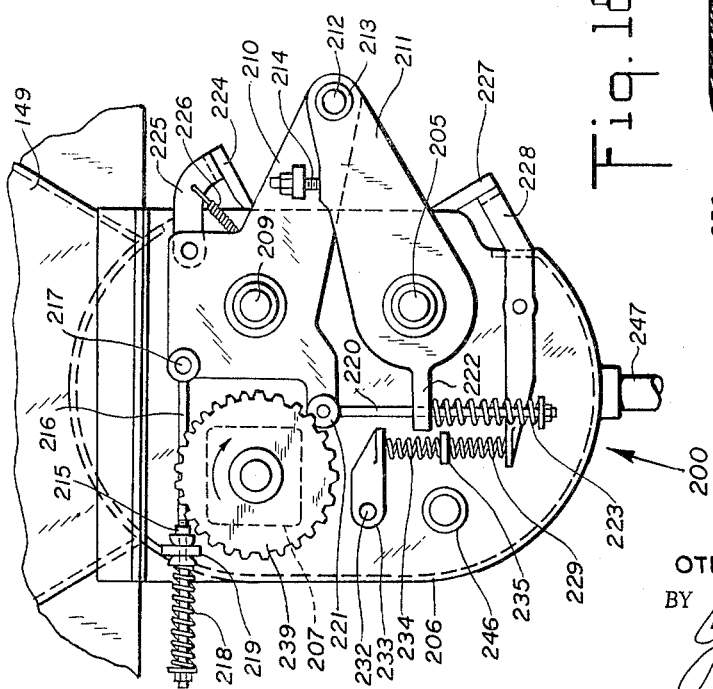
FIGURE 18 is a left side elevational view of the press of FIGURE 16.

Referring to FIGURES 16–20, press 200 is seen to comprise cylindrical rollers 201, 202 and 203 (FIGURE 19). Two separate screen rolls 201 and 202 are mounted on shafts 204 and 205 in a fixed position in housing 206. Screen rolls 201 and 202 are free to rotate in bearings 207 and 208 (FIGURES 16 and 17). Freely floating solid roll 203 is positioned in housing 206 alongside screen roll 201 and above screen 202. Roll 203 is formed of rubber or similar resilient material and is mounted on shaft 209. The movement of roll 203 in both the vertical and horizontal directions is controlled by linkage arms 210 and 211 (FIGURE 18). There are two linkage arms 210 and two linkage arms 211, one of each on each side of the press (FIGURES 16 and 17). Linkage arms 211 are pivoted on shaft 205 of lower screen roll 202. Linkage arms 210 are coupled to linkage arms 211 by means of pin 212 and held in position by collar 213. Vertical spacing between rolls 203 and 202 are adjusted by means of screw stop 14 (FIGURE 18).

Horizontal spacing between rolls 203 and 201 is adjusted by means of ball nut 215 which is mounted on spring rod 216. Spring rod 216 is coupled to linkage arm 210 by means of pin and collar 217. Spring 218, which is mounted on rod 216, is employed to adjust the pressure to be applied to the sludge by rolls 203 and 201. Lug 219, which is affixed to housing 206, provides the stop for spring 218. The pressure between rolls 203 and 202 is controlled by spring rod 220. Rod 220 is fastened to linkage arm 210 by means of pin and collar 221. Rod 220 passes through extension lug 222 of linkage arm 211 and is spring loaded by means of spring 223.

Scraper blade 224 (FIGURES 16, 18 and 19) is formed of Bakelite or other suitable material and is mounted on pivoted arms 225. Arms 225 are attached to upper linkage arm 210. Scraper blade 224 is held in pressure engagement with the surface of roll 203 by means of spring 226. Scraper blade 227, which is formed of material similar to that of blade 224, is mounted on pivoted arms 228 and is held in pressure engagement with roll 202 by means of spring 229. Pivoted arms 228 are mounted to housing 206. Scraper blade 230 of similar material to the other scraper blades is mounted on arms 231 whose pivot pins 232 are journaled in housing 206. Outside pivot arms 233 are rigidly fastened to pins 232 so as to provide a point for the spring loading of blade 230 against roll 201. This spring loading is accomplished by means of spring 234. Lug 235, which is affixed to housing 206, serves to anchor springs 229 and 234.

Flap 236 is connected to chute 149 by means of hinge 237. This provides a flexible stop for chute 149 and permits free vertical and horizontal movement of roll 203 while preventing any sludge dropped through chute 149 from escaping from press 200. Flap 236 is formed of Bakelite, neoprene rubber or similar material which will not cause unnecessary wearing of roll 203.

The rolls of press 200 are driven from main drive shaft 129 (FIGURE 12) in the following manner: rotation of drive shaft 129 rotates sprocket 130 which is mounted thereon. Roller chain 238 couples sprockets 130 and 239 which is mounted on shaft 204 (FIGURES 16 and 18). Sprocket 240 is mounted on the opposite end of shaft 204 (FIGURE 17) and drives shaft 205 by means of chain 241 and sprocket 242. Chain 241 also engages sprocket 243 to drive shaft 209. In order to provide for positive engagement of the chain and sprockets and to still permit free vertical and horizontal movement of roll 203, it is necessary to attach chain guide block 244 to linkage arm 210. The chain guide block holds the chain and sprockets in constant engagement. I prefer that sprockets 240, 242 and 243 be identical in pitch, diameter and number of teeth so that all the rolls rotate at exactly the same velocity.

Suitable spray heads 245 are positioned to spray water from pipe 246 onto rolls 201 and 202. The rolls are usually sprayed after the machine operation has stopped. It is well to clean the press in this manner so that any sludge particle which may have become lodged in the apertures will be removed. If sludge is permitted to dry and harden in the apertures, the efficiency of the press will be reduced.

The operation of press 200 proceeds as follows: partially deliquefied sludge from the deliquefied cake zone drops down chute 149 onto rolls 203 and 201. Rotation of the rolls toward each other in spaced relationship causes the material to be progressively fed between the rolls at increasing pressure . This causes the liquid to flow through screen roll 201 and the solids to form a cake or layer on the surface of the screen. The solids which have adhered to screen roll 201 are scraped off by scraper 230 and forced between rolls 203 and 202. The sludge is now further deliquefied by being subjected to pressure between rolls 203 and 202. The liquid flows through the screen and the solids form a layer or cake on the screen. This layer or cake is scraped from the screen by scraper 227 and the material is discharged from the press as shown in FIGURE 19. The liquid 260 removed during both stages of deliquefying in the press flows through pipe 247 and is returned to the head of the plant.

The sludge discharged from the press may be handled by a shovel, conveyor or other convenient means and is usually burned. Since the solids content of the discharged sludge is of the order of 30% to 33% it will support combustion without the addition of any fuel.

I have found that once the sludge has been filtered to a certain consistency at pressures less than the critical filtering pressures on a particular screen that application of higher pressure will cause screen aperture jamming. It is therefore necessary to remove the sludge from the screen, reform the mass and then apply a higher filtering pressure. I use a two stage press because mechanical design dictates that more than two stages are not economically practical.

Solid roll 203 is spaced about ⅛ inch from screen rolls 201 and 202. This gap opening will allow entry of sludge between the rolls while under the respective spring loads for each stage. The gaps are set by means of adjustable stops 214 and 215.

Figure 20:
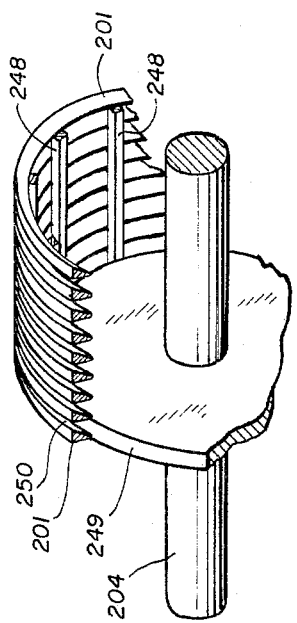
FIGURE 20 is an enlarged perspective view, partly cut away, of the screen wire form and support means employed in the press of FIGURE 16.

In FIGURE 20 there is illustrated an enlarged perspective view, broken away to the detailed structure of roll 201. The screen surface is seen to comprise a plurality of trapezoidal wires circumferentially or spirally wound over support bars 248 which are mounted on end discs 249. The entire assembly is mounted on shaft 204. The spacing betwen the successive windings of the screen is such that suitable apertures 250 approximately 10 to 15 thousandths of an inch in width are provided. The trapezoidal shape of the wires provides tapered bottom openings which permit very small sludge particles to pass through the screen and thereby prevent buildup and plugging. The screen wires and the support bars 248 should be made of stainless steel or similar noncorrosive material. The surface width of the wires should be of the order of 1/16 to 3/32 inch for rigidity and strength and should taper to the order of 1/64 to 1/32 inch. Larger wire sizes will create too much dead surface and reduce filtering efficiency. Roll 202 is formed in substantially the same manner as roll 201. It comprises end discs 249A and supports 248A and is mounted on shaft 205.

I prefer to form solid roll 203 of semi-hard rubber stock which deforms slightly in the event that some hard material such as a metal piece passed through the press. This in some measure prevents damage to the screen rolls. However, roll 203 may be fashioned from cast iron, wood, plastic or any other relatively firm material. I have found it advisable to make solid roll 203 many sided rather than a circular cylinder. These faces are formed, for example, on shallow chords approximately one inch wide on a roll diameter of four inches. These flats aid in the varying of the pressure being applied to the sludge material being processed.

By way of illustration and not by way of limitation of the scope of my invention, following is an example of a single cell sewage filter of my invention in combination with a sewage press as described above:

*Example I*

Stage one (cell 120):
    Length: 61″
    Width: 33″
    Height: 35″
    Diameter of end discs 190 and 191: 19″
    Diameter of rings 124A and 124B: 19″
    Height of lip 147: 2″
    Height of lip 148: 3⅛″
    Type of cloth 122: Nylon monofilament 100 mesh weave, 100 denier yarn—
        Length: 120″
        Width: 18″
        Travel velocity: 0.7″ per second to 2¼ inches per second
    Percent solids incoming slurry: 1½% or greater
    Percent solids in sludge delivered from stage one: 11% to 18%
Stage two (press 200):
    Length: 10″
    Width: 8″ operating face
    Height: 13″
    Diameter of roll 203: 4″
    Diameter of rolls 201 and 202: 4″
    Lineal surface velocity of screen wire:
        24.5″/min. minimum
        28.5″/min. normal
        74.5″/min. maximum
    Percent solids in incoming sludge: 11% to 18%
    Percent solids in sludge delivered from stage two: 25% to 33%

Following is an example of a multi-cell sewage filter of my invention:

*Example II*

Stage one (cell 120″):
    Length: 61″
    Width: 53″
    Height: 35″
    Diameter of end discs 190′ and 191′ and intermediate disc 161: 19″
    Diameter of rings 124A′ and 124B′ and intermediate disc 124C′: 19″
    Height of lip 147: 2″
    Height of lip 148: 3⅛″
    Type of cloth 122: Nylon monofilament 100 mesh weave, 100 denier yarn—
        Length: 120″
        Width: Two sections 18″ wide
        Travel velocity: 0.7″ per second to 2¼″ per second
    Percent solids in incoming slurry: 1½% or greater
    Percent solids in sludge delivered from stage one: 11% to 18%

Cells 120′ are of the same dimensions as previously described filter 20.

Stage two:
    Length: 10″
    Width: 16″ operating face
    Height: 13″
    Diameter of roll 203: 4″
    Diameter of rolls 201 and 202: 4″
    Lineal surface velocity of screen wire:
        24.5″/min. minimum
        28.5″/min. normal
        74.5″/min. maximum
    Percent solids in incoming sludge: 11% to 18%
    Percent solids in sludge delivered from stage two: 25% to 33%

An alternate embodiment of a two stage press within the scope of my invention comprises multifaced screen rolls.

In this embodiment the structure and operation are exactly the same except that the screen rolls have flats of the same dimensions as those of roll 203 so that they are in register. Since the rolls rotate at identical velocities, the faces will remain in register during operation. This provides some measure or gradual pressure application at each stage of the press. With certain types of sludges, I have found it advisable to register the edges of the multifaced solid roll with the faces of the screen rolls. This produces undulating pressure on the sludge and provides for improved filtering.

I have found that liquid is best removed from a sludge by applying the pressure in gradually increasing increments from zero to the maximum allowable under the critical filtering pressure. The greater part of the liquid is removed when the maximum allowable pressure is applied for a time of the order of a few seconds. When the faces are in register the maximum pressure is applied for a longer period of time than when they are out of register. When the faces are out of register in the filtering, driving power is greater than when they are in register. Thus, it can be seen that under certain conditions it is better to have the faces in register and under other conditions it is better to have them out of register.

Sewage filters of my invention may be used to separate the solids from the liquid at any stage of treatment in the sewage disposal plant. However, best results are obtained when fresh raw primary sludge, which has been settled for about two hours, is used. At this point the solids contain less colloids than are present further along in the disposal process. The solids also contains a reasonable amount of cellulose fiber which is useful and effective in the agglomerating of the colloids and suspended particles. Upon the agglomeration of the colloids and suspended particles, the liquid which is held in mechanical bond may be released freely onto the filter medium. The cellulose fiber also aids in the formation of a rolling cylindrical mass of the solid material and thereby facilitates in the disposal of the dewatered material. The rolling cylindrical mass is formed more easily because the particles are held together and the dewatered sludge is stripped from the cloth filter material.

When sewage filters of my invention are used for deliquefying the sludge after it has been treated in digestion tanks or similar devices, it is often necessary to add a cellulose fiber material to the sludge in order to aid in the agglomeration process.

I have found it best to add pulped paper fiber to the digested sludge in order to agglomerate the colloids. This is generally necessary with most treated sludges because chemical coagulation does not free the trapped liquid as effectively or as rapidly. Slow freeing of the trapped liquid results in lower flow rates and reduced filtering capacity.

There are many variations of combinations of sewage solids depending on the type of original sewage and the type and amount of treatment. However, all these variations can be deliquefied using the sewage filter of my invention by adding pulped paper fiber or raw primary sludge which contains cellulose fiber material to the sludge being deliquefied. I have found that the addition of a maximum of one-third of a pound of pulped paper fiber per pound of sewage solids on a dry weight basis is sufficient to obtain good agglomeration. This amount of pulped paper fiber may be reduced down to zero depending on the colloidal content of the liquid to be filtered and the cellulose content of the solid being deliquefied.

It is obvious that industrial wastes may also be deliquefied using the sewage filter of my invention. Many of these industrial sludges contain sufficient cellulose material so that it is unnecessary to add any pulped paper fiber.

In order to prevent plugging of the filter medium in gravity type cloth filters, it is necessary that the cloth filter medium be unsupported except at the edges. This prevents fine sticky particles of solids from becoming lodged between the cloth and the support and plugging the filter medium. These plugged areas tend to enlarge due to the adherence of the particles to one another so that eventually the filter cloth becomes quite ineffective. When the filter medium is unsupported except at the edges it tends to be free of plugging and the semi-deliquefied sludge mass serves to clean the filter medium. This is accomplished because the particles on the cloth are held together loosely and they tend to adhere to the mass which tends to hold the particles together more tightly.

I have found that filters of my invention operate more efficiently when the idler sprocket and the drive sprocket are positioned at substantially opposite ends of the diameter of the free-floating ring with which they are associated. This placement affords better support of the ring and substantially eliminates sidewise flopping of the ring.

While I have disclosed my invention in relation to specific examples and in specific embodiments, I do not wish to be limited thereto, for obvious modifications will occur to those skilled in the art without departing from the spirit and scope of my invention.

What is claimed is:

1. An apparatus for separating liquid from solids by filtration comprising, in combination:
   (a) a frame;
   (b) an endless belt filter;
   (c) means on said frame for supporting said belt and guiding it successively through a filtering zone, deliquefied cake zone and a belt return zone;
   (d) means for feeding liquid to said filtering zone;
   (e) means for preventing the flow of liquid from said filtering zone to said deliquefied cake zone;
   (f) said deliquefied cake zone comprising a depressed collection portion terminating in a portion inclined upwardly at an angle sufficient to cause deliquefied cake to collect and roll into a roughly cylindrical mass in said depressed collection portion to clean said belt; and
   (g) means for driving said belt.

2. An apparatus as claimed in claim 1 including a press positioned adjacent to said deliquefied cake zone.

3. An apparatus as claimed in claim 2 wherein said press comprises:
   (a) a pair of spaced parallel rollers, one of said rollers being hollow and having a perforated surface for allowing the passage of water;
   (b) means for causing said rollers to rotate in opposite directions;
   (c) means for feeding partially deliquefied sludge between said rollers;
   (d) means for resiliently urging one of said rollers toward the other for pressing said sludge and forcing a portion of the water contained therein through the surface of said perforated hollow roller thereby removing water therefrom.

4. An apparatus for separating liquid from solids by filtration comprising, in combination:
   (a) a frame;
   (b) an endless belt filter;
   (c) means on said frame for supporting said belt and guiding it successively through a filtering zone, deliquefied cake zone and a belt return zone;
   (d) means for feeding liquid to said filtering zone;
   (e) a portion of said supporting and guiding means being positioned to elevate said belt to an elevation above the liquid level in said filtering zone as it passes from said filtering zone to said deliquefied cake zone;
   (f) said deliquefied cake zone comprising a depressed collection portion terminating in a portion inclined upwardly at an angle sufficient to cause deliquefied cake to collect and roll into a roughly cylindrical mass in said depressed collection portion to clean said belt; and
   (g) means for driving said belt.

5. An apparatus for separating liquids from solids by filtration comprising, in combination:
   (a) a frame;
   (b) a moving endless belt filter;
   (c) a first pair of axially spaced, rotatable circular members adapted to engage the edges of said belt to guide the same and to define therewith a substantially cylindrical liquid containing space;
   (d) means for feeding the liquid to be filtered to said space and for maintaining a pool of said liquid of predetermined depth in said space;
   (e) a second pair of axially spaced rotatable circular members engaging the edges of said belt to guide the same and to define therewith a substantially cylindrical deliquefied cake zone;
   (f) means positioned between said liquid containing space and said deliquefied cake zone for elevating said belt above the level of liquid in said pool; and
   (g) means for driving said belt.

6. An apparatus as claimed in claim 5 wherein said means for maintaining a pool of liquid of predetermined depth in said liquid containing space comprises means for feeding liquid into said space at a rate higher than the filtration rate, and a centrally located opening in at least one of said first pair of circular members defining one end of said cylindrical liquid containing space, said opening being adapted to allow liquid to overflow when it reaches the predetermined depth.

7. An apparatus according to claim 5 wherein said circular members are formed with grooves in the outer periphery thereof, and said belt is provided with a resilient flexible member located at each edge thereof adapted to engage said grooves in liquid tight relationship.

8. An apparatus according to claim 6 wherein said endless belt filter comprises:
 (a) a pair of endless chains;
 (b) sprocket means engaging said chain for driving the same;
 (c) a porous cloth filter belt; and
 (d) slide fastener means connecting said endless chains to the edges of said endless belt;
whereby said filter belt can be easily separated from said driving means for repair or replacement.

9. An apparatus as claimed in claim 8 including spaced tie rods affixed to said endless chains and extending transversely across said endless belt filter, the central portion of said tie rod being spaced from the filtering surface of said belt a distance sufficient to prevent contact with said belt whereby improper tracking and lateral deformation of said endless belt filter is prevented.

10. An apparatus as claimed in claim 8 including adjustable tensioning means engaging said chains for maintaining the tension of said endless belt filter to insure liquid tight contact of said resilient flexible members with said circular members.

11. An apparatus according to claim 5 wherein one of said circular members comprises free floating rings, at least one of said rings having a central opening providing an unobstructed outlet.

12. An apparatus according to claim 11 wherein said free floating rings have openings having diameters of unequal sizes.

13. A sewage filter comprising:
 (a) a frame;
 (b) a pair of spaced, grooved discs mounted in said frame and rotatable with respect thereto;
 (c) one of said discs having an opening therein;
 (d) a pair of free-floating, grooved rings having central openings of different diameters therein mounted in said frame;
 (e) a pair of drive sprockets mounted to said frame;
 (f) a pair of endless chains adapted to engage said drive sprockets;
 (g) means for driving said pair of drive sprockets;
 (h) an endless belt filter medium affixed to said endless chains at the edges of said endless belt, passing around said grooved discs and said free-floating, grooved rings positioned so as to be divided into a liquid filtering zone, a deliquefied cake zone and a return zone;
 (i) a plurality of spaced tie rods affixed to said pair of endless chains such that the tie rods extend across the endless belt filter medium and underlie it in the liquid filtering and deliquefied cake zones;
 (j) means for feeding material to be filtered and deliquefied onto said endless belt filter medium in the liquid filtering zone;
 (k) a pair of flexible dams shaped to cooperatively engage the grooves in said grooved discs and said free-floating, grooved rings affixed to the edges of said endless belt on the groove-engaging surface thereof;
 (l) a pair of idler sprockets mounted in said frame adjacent said pair of free-floating rings engaging said pair of endless chains;
 (m) means for collecting the liquid removed from said material;
 (n) a chute mounted to said frame below said ring having the central opening of larger diameter; and
 (o) a press at the lower end of said chute adapted to receive sludge discharged down said chute.

14. An apparatus as described in claim 13 wherein said press comprises:
 (a) a housing;
 (b) a first shaft mounted in said housing and rotatable therein;
 (c) a first screen roll mounted on said first shaft and rotatable therewith;
 (d) a first pair of linkage arms mounted to said first shaft one at each end thereof;
 (e) a second pair of linkage arms mounted to said first pair of linkage arms;
 (f) a second shaft mounted to said second pair of linkage arms and rotatable with respect thereto;
 (g) said second shaft being located above said first shaft;
 (h) a solid roll mounted on said second shaft and rotatable therewith;
 (i) a third shaft mounted in said housing and rotatable therein;
 (j) said third shaft being located alongside said second shaft;
 (k) a second screen roll mounted on said third shaft and rotatable therewith;
 (l) means for adjusting the spacing between said solid roll and said first screen roll;
 (m) means for adjusting the spacing between said solid roll and said second screen roll;
 (n) means for draining liquid, which collects in the housing, from the housing; and
 (o) means for rotating all three said shafts at the same velocity.

15. An apparatus as described in claim 14 wherein said solid roll is multifaced.

16. An apparatus as described in claim 15 wherein said screen rolls are multifaced and the faces thereof are in register with the faces of said solid roll.

17. An apparatus as described in claim 15 wherein said screen rolls are multifaced and the faces of said solid roll are out of register with the faces of said screen rolls.

18. A press for a sewage filter comprising:
 (a) a housing;
 (b) a first shaft mounted in said housing and rotatable therein;
 (c) a first screen roll mounted on said first shaft and rotatable therewith;
 (d) a first pair of linkage arms mounted to said first shaft one at each end thereof;
 (e) a second pair of linkage arms mounted to said first pair of linkage arms;
 (f) a second shaft mounted to said second pair of linkage arms and rotatable with respect thereto;
 (g) said second shaft being located above said first shaft;
 (h) a solid roll mounted on said second shaft and rotatable therewith;
 (i) a third shaft mounted in said housing and rotatable therein;
 (j) said third shaft being located alongside said second shaft;
 (k) a second screen roll mounted on said third shaft and rotatable therewith;
 (l) means for adjusting the spacing between said solid roll and said first screen roll;
 (m) means for adjusting the spacing between said solid roll and said second screen roll;
 (n) means for draining liquid, which collects in the housing, from the housing; and
 (o) means for rotating all three said shafts at the same velocity.

References Cited by the Examiner

UNITED STATES PATENTS

| | | | |
|---|---|---|---|
| 82,735 | 10/1868 | Merrill | 210—198 |
| 445,371 | 1/1891 | Jewell | 210—401 X |
| 453,815 | 6/1891 | Martin | 210—401 |

(Other references on following page)

UNITED STATES PATENTS

| | | | |
|---|---|---|---|
| 594,415 | 11/1897 | Morrison | 210—198 |
| 620,786 | 3/1899 | Koerper et al. | 210—401 X |
| 1,194,266 | 8/1916 | Alvord | 100—121 |
| 1,201,021 | 10/1916 | Callow | 210—401 X |
| 1,405,211 | 1/1922 | Haug | 210—326 X |
| 2,044,386 | 6/1936 | Goding | 100—121 X |
| 2,069,448 | 2/1937 | Ireland et al. | 100—116 X |
| 2,619,232 | 11/1952 | Parsons et al. | 210—391 X |
| 2,652,927 | 9/1953 | Komline | 210—401 |
| 2,798,424 | 7/1957 | Smith et al. | 210—386 X |
| 2,798,609 | 7/1957 | Smith et al. | 210—66 |
| 2,844,253 | 7/1958 | Everett | 210—403 X |
| 2,876,697 | 3/1959 | Van Tillo | 100—121 |
| 2,880,875 | 4/1959 | Alston | 210—401 |
| 3,117,927 | 1/1964 | Smith | 210—326 |

FOREIGN PATENTS 11,006    10/1909    France.
           (2nd addition to 336,807)

LOUIS O. MAASSEL, *Primary Examiner.*